United States Patent [19]
Mitsuishi

[11] 3,917,310
[45] Nov. 4, 1975

[54] COLLAPSIBLE CANOPY ASSEMBLY

[75] Inventor: Yoshiji Mitsuishi, Yokohama, Japan

[73] Assignee: Caterpillar Tractor Co., Peoria, Ill.

[22] Filed: Nov. 19, 1974

[21] Appl. No.: 525,241

[30] Foreign Application Priority Data
Nov. 24, 1973  Japan............................ 48-134644

[52] U.S. Cl............................. 280/150 C; 296/107
[51] Int. Cl.²........................................... B60J 7/24
[58] Field of Search.......... 280/150 C; 296/107, 102

[56] References Cited
UNITED STATES PATENTS

| 3,472,550 | 10/1969 | Marco | 296/107 |
|---|---|---|---|
| 3,713,688 | 1/1973 | Monroe | 280/150 C |
| 3,762,761 | 10/1973 | Erickson | 280/150 C |

*Primary Examiner*—Robert R. Song
*Attorney, Agent, or Firm*—Phillips, Moore, Weissenberger Lempio & Strabala

[57] ABSTRACT

This invention relates to a collapsible canopy assembly, which is a protective device mounted on an operator's station on a construction or earth-moving machine in which the operator actuates the machine sitting within the protective device, which comprises a roll-over protective structure, a canopy top and a head guard for the operator. Because of the projection of the protective device above the operator's station the height of the machine happens to exceed the limitation of height under traffic laws when it is loaded on a trailer for transfer. And in operating the machine in a tunnel, the protective device will also be a stumbling block to a "jumbo drill." In the present invention, the protective device is made collapsible at any time be it in violation of traffic laws or transfer of the machine in a tunnel. Further not only is the device easily collapsible by one operator but also raising or collapsing thereof is safely carried out with no injuries to the operator.

9 Claims, 6 Drawing Figures

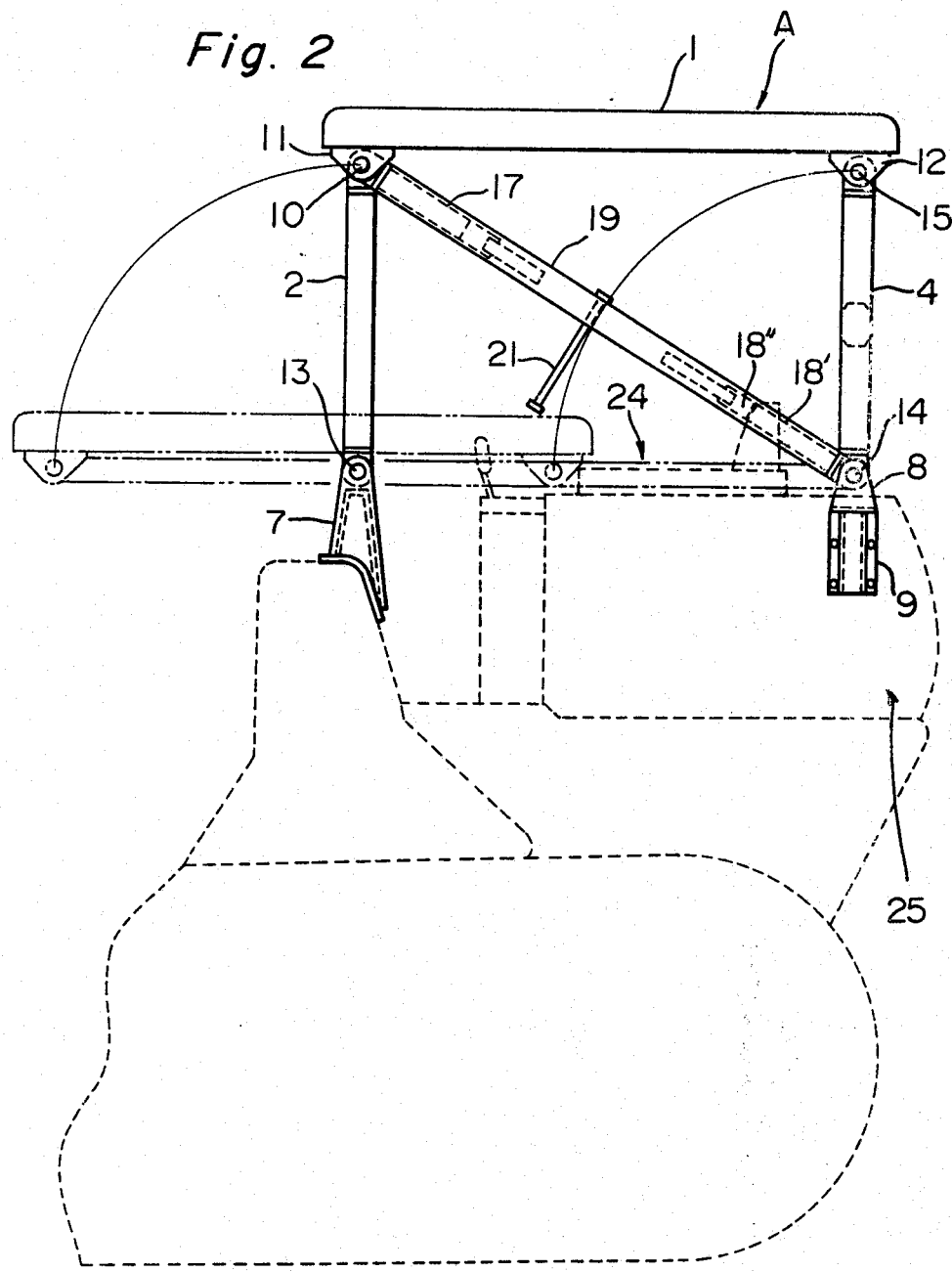

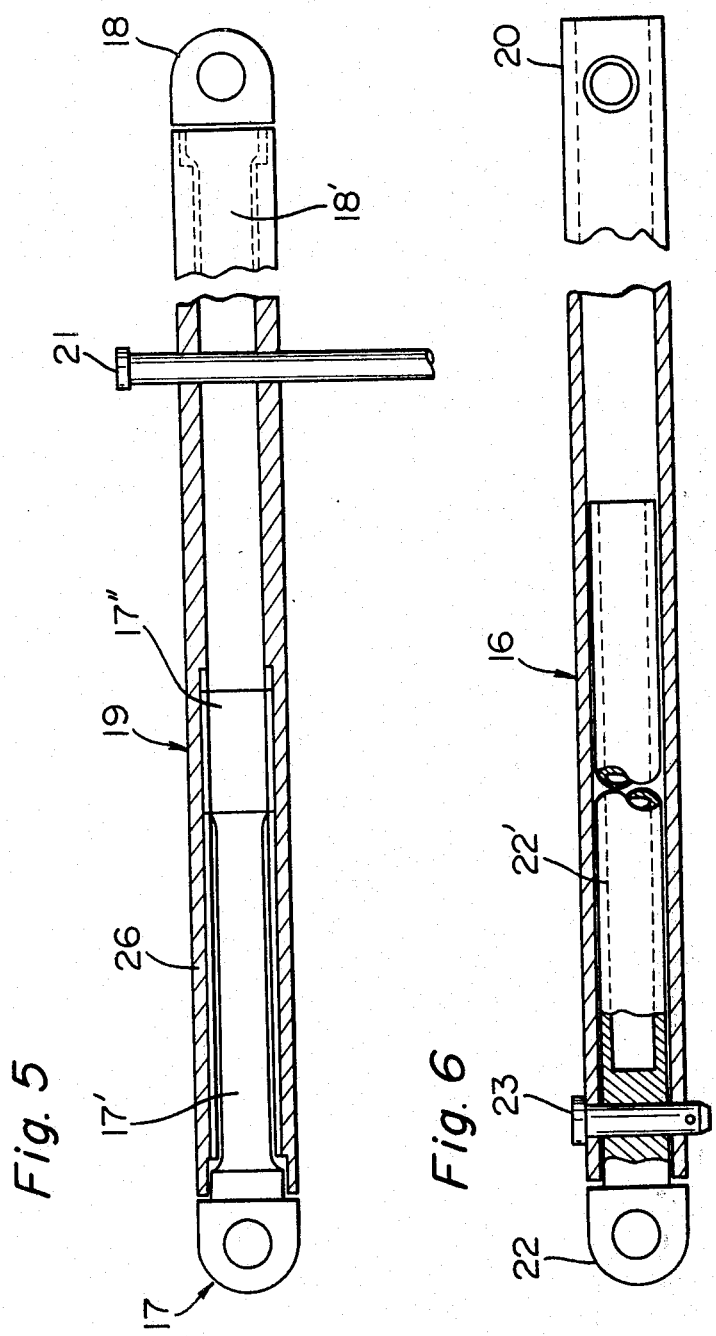

COLLAPSIBLE CANOPY ASSEMBLY

BACKGROUND OF THE INVENTION

The present invention relates to a protective device which is called a collapsible canopy assembly encircling an operator's station on a construction or earth-moving machine, which is accompanied by a canopy top, a head guard and a roll-over protective structure.

The protective device is arranged on an operator's station at the rear of the machine. The operator operates the machine while sitting within the protective device. The protective device is composed of a roof, four supports, and brackets for securing the supports to the machine over the operator's station. Thus the canopy assembly projects above the operator's station. This projection causes some troubles. That is, since the machine cannot run fast as compared with general vehicles, the machine is usually carried fast on a trailer. With the canopy projected, the machine becomes higher and happens to viclate the height limitation in traffic laws. And in tunnel construction, a jumbo drill is in use and the canopy assembly stands in its way. The machine with the projection detached can pass through the jumbo drill. As a counter-measure, a collapsible canopy assembly has been divised. If it can be collapsed and flattened to shorten the height, there occurs no traffic law violation and free pass of the machine is possible in a tunnel in the presence of a jumbo drill. The collapsed and flattened protective device is thereafter erected as a vertical shape for its proper use.

A collapsible canopy assembly has the aforesaid advantages, but operations of the assembly should be carefully considered.

The problems are the strength of the assembly as a whole due to collapsibility of the assembly and the collapsing procedures.

The frist strength problem depends upon light weight or heavy weight of the assembly. For instance, when the collapsible device is just a simple device mainly for a sun-shade or rain-cover for an operator's station, roof materials may be reinforced fiber glass or simply a framed water-proof cloth and hence the supports for supporting it may be lightweight. In such a lightweight protective device, the collapsing part is not prone to damage from various vibrations and collapsing procedures need only one operator. Further hazard or operating danger lessens.

In contrast, in a heavyweight collapsible canopy assembly constructed to protect an operator in view of the protective standards, the roof and four supports increase weight and owing to this weight, damage is likely to occur in the collapsible connecting portions. Further, during operations, the supports are likely to break through various vibrations of the machine. A heavyweight assembly will need labor of morethan one operator or at the time of collapsing. With reference to the prior art canopy connection illustrated in FIG. 1, this will be described below.

FIG. 1 shows partly a connection between the lower part of support 50 of the collapsible canopy assembly and bracket 51 of an operator's station in the prior art. Bracket 51 is secured to the machine encircling an operator's station. At the lower end of support 50 are disposed two vertically spaced pin holes and at bracket 51 are disposed holes 54 and 55, which match said pin holes in place thereof pivot pins 52 and 53 therein. Thus support 50 can not rotate except upon pulling out pin 53, whereby support 50 can be folded in the arrow direction with the fulcrum at upper pin 52. Such restraint can be maintained by such arrangements of at least one or more supports to keep the canopy assembly vertical. As described above, when the canopy assembly is light in weight, it works. When it comes to a heavyweight assembly, as a pin is pulled out, each support falls down in the same direction at the same time therefore, it is necessary that each support be held manually, etc. and brought down at low speeds. It cannot be operated by only one operator, but two or more operators are required.

SUMMARY OF THIS INVENTION

The present invention has eliminated the aforesaid two disadvantages. In a collapsible canopy assembly comprising a roof, four supports and brackets for securing the supports to the machine over the operator's station, one diagonal stay is mounted on one side of the collapsible canopy assembly. The lower end of the stay is pivotally mounted on the bracket of the operator's station, which is located below the rear support on said side, and the upper end of the stay is pivotally mounted on the upper end of the front support of said side or an adjacent roof frame. An appropriate extensible mechanism, eg., a turn-buckele mechanism is incorporated in the diagonal stay and freely extends or contracts through the rotation of an outer cylinder. In addition to the aforesaid stay, a second stay is disposed on the opposite side, in which a sliding mechanism is incorporated. As a restraint member of the sliding mechanism is released, the turnbuckle of the first stay is revolved to collapse the canopy assembly. In erecting it, the turnbuckle mechanism may be inversely revolved. Safe operations can be easily conducted by one operator.

It is the object of the present invention to provide an operator's station of a construction machine with a protective device usable as a canopy top, a head guard, a roll-over protective structure, etc. in combination such that the protective device is collapsible back and forth relative to the machine to obtain a laborsaving device which has not been the case before.

It is another object of the present invention to obtain a durable protective device sufficiently capable of holding stress and load of a heavyweight roof.

Still another object is to obtain a protective device capable of being raised or collapsed by one operator. A further object is to obtain a safe protective device in which there is no fear of an accident during the raising or collapsing operation.

BRIEF DESCRIPTION OF THE DRAWINGS

FIG. 2 is a side elevational view of a protective device of the present invention.

FIG. 5 is an enlarged cross section illustrating a diagonal stay with a turnbuckle mechanism incorporated therein.

FIG. 6 is an enlarged cross section illustrating a diagonal stay with a sliding mechanism embedded.

Figure 1:
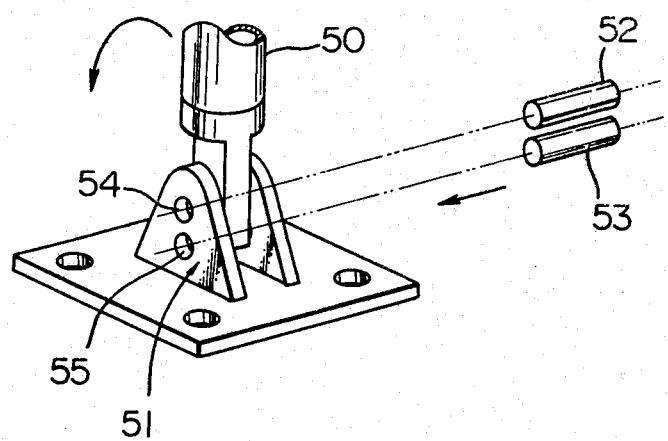
FIG. 1 shows a lower portion of a support of a conventional protective device, employing a standard pin connection thereat.

With reference to the accompanying drawings, an embodiment of the present invention will be described below.

DETAILED DESCRIPTION

In FIG'S 2 and 3, protective device A consists of roof 1, brackets 8, 8', supports or support means 2, 4, 3, 5 and diagonal stays 16, 19. Supports 2, 4, 3, 5 stand such that operator's station 24 at the rear of machine 25 is enclosed, and are pivoted upwardly on brackets 7, 7', 8, 8' secured to machine 25 wherever appropriate by means of pins 13, 13', 14, 14', which are provided at the lower ends of supports 2, 4, 3, 5.

Figure 4:
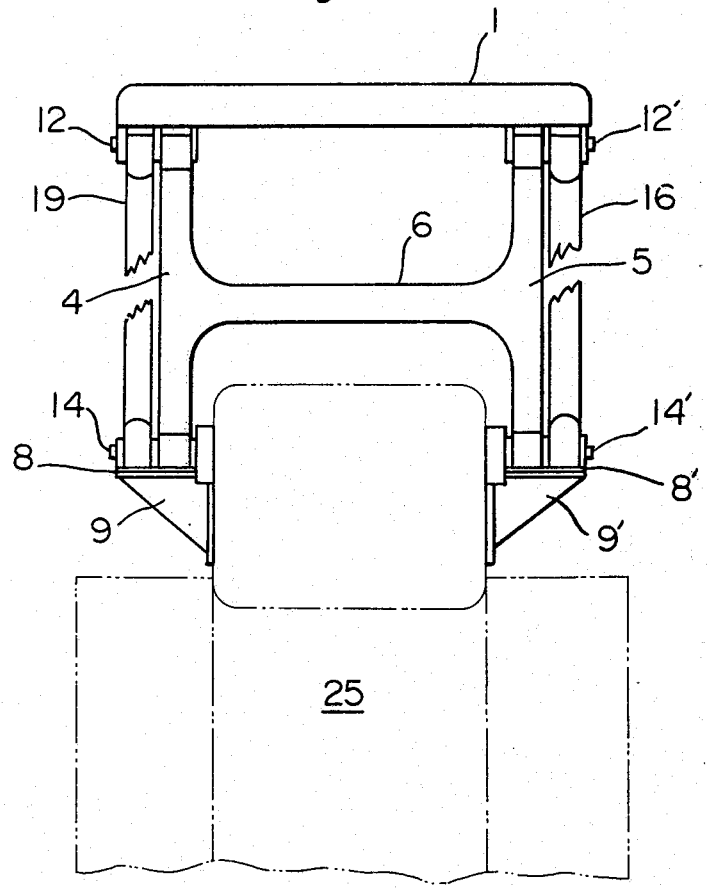
FIG. 4 is a side elevational view of the protective device, opposite to the side shown in FIG. 2.

Brackets 8, 8' at the rear of the machine are secured to fixed bases 9, 9' projected outside the machine. Brackets 8, 8' are made longer from side to side than other brackets, because they make a common bracket for the ends of diagonal stays 16 and 19 and of supports 4 and 5 as shown in FIG. 4.

Brackets 7, 7' at the front of the machine are so angular as to agree with the fixed height of brackets 8, 8'. The other ends of supports 2, 3, 4, 5 made rotatable with pins 13, 13', 14, 14' of brackets 7, 7', 8, 8' on the side of the machine are pivotally mounted on clevis type brackets 11, 11', 12, 12' secured to the four corners of roof 1 by means of pins 10, 10', 15, 15'.

Like brackets 8, 8' at the rear of the machine brackets 11, 11' at the front of the machine are made longer side-ways than other brackets to make a common bracket for the ends of diagonal stays 16, 19.

The upper ends of diagonal stays 16, 19, facing each other and extending upwardly from brackets 8, 8' at the rear of the machine, are pivotally mounted on the tops of front supports 2, 3 or an adjacent roof frame. Both ends of the stays are pivotally mounted by pins 14, 14', 10, 10' on brackets 8, 8', 11, 11'. Thus protective device A can take a parallelogram-type linkage motion as a whole.

In FIG.'S 5 and 6, diagonal stay 19 is shown as a brace having a turnbuckle mechanism of an ordinary type. Inside one end of cylinder 26, left-hand screw threads are formed and inside the other end of the cylinder right-hand screw threads are formed. Shaft 17', having left-hand screw threads formed thereon, is screwed into the end of the cylinder having the aforesaid left hand screw threads whereas shaft 18', having right-hand screw threads formed thereon, is screwed into the end of the cylinder having the aforesaid right hand screw threads. The outer ends of shafts 17' and 18' are provided with pin holes for connection to the appropriate pivot pins. About in the middle portion of cylinder 26 is disposed rotary lever 21. Outer cylinder 26 is revolved by rotating lever 21 and hence both shafts can be rendered extensible. Diagonal stay 16 has sliding shaft 22' at one side end and interiorly of of the cylinder 20, as shown in FIG. 6. Since the extension of shaft 22' is usually prevented with restrainer pin 23, diagonal stay 16 is kept stationary.

Restrainer pin 23 is easily detachable through the outside of the cylinder and by the removal of pin 23, sliding shaft 22' may be extended therefrom.

It is optimal that the total length of sliding shaft 22' be about two-thirds as long as the total length of the outer cylinder. As described above, it is desirable that a pair of diagonal stays 16, 19 be arranged such that when one of them is a brace having a turnbuckle mechanism, the other is a brace having a sliding mechanism. It is so desirable because as soon as the restrainer pin is removed, for instance, when both are a brace, protective device A can be expeditiously collapsed by extending only the turnbuckle mechanism. Should both diagonal stays comprise a turnbuckle mechanism, collapsing operations would become slow. In a lightweight protective device, only a brace having a turnbuckle mechanism will suffice, without the aid of a brace having a sliding mechanism.

Since roof 1 is formed of material such as a steel plate capable of protecting an operator from falling objects, supports sufficient enough to bear the weight of the roof are preferably made of tube-like or square-shaped steel pipe. As shown in FIG. 4, supports 4 and 5 at the rear of the machine are reinforced with horizontal stay 6 secured by welding between supports 4 and 5, which is preferably of a cross member type.

The weight of roof 1 and various vibrations during the operations of the machine tend to concentrate on protective device A. Load from the front and back directions of the machine is borne by diagonal stays 16, 19 and each support, and lateral load can be borne by horizontal stay 6.

Hence even if thickness of a steel plate for the roof is increased to some extent so that the strength of the roof may be increased, protective device A has a structure to bear sufficiently the increased load.

Then the function and effect of the present invention will be described below.

Since connections among roof 1, the supports and the braces, and between the supports and braces and each bracket are laterally pinned, the supports and the braces can oscillate back and forth with the fulcrum at each pin. In other words, protective device A can make a parallel link motion. During the operations of the machine, protective device A is restrained with a pair of left and right braces from its oscillations and in carrying the machine, one restrainer pin is pulled out and the lever of another brace side is turned to expedite collapsing of protective device A.

The length of each brace is adapted to be the shortest in the position in which each support stands erect and the longest in the most collapsed state, that is, in the position in which roof 1 shown by phantom lines in FIG. 2 is loaded on an engine cover (not shown).

Figure 3:
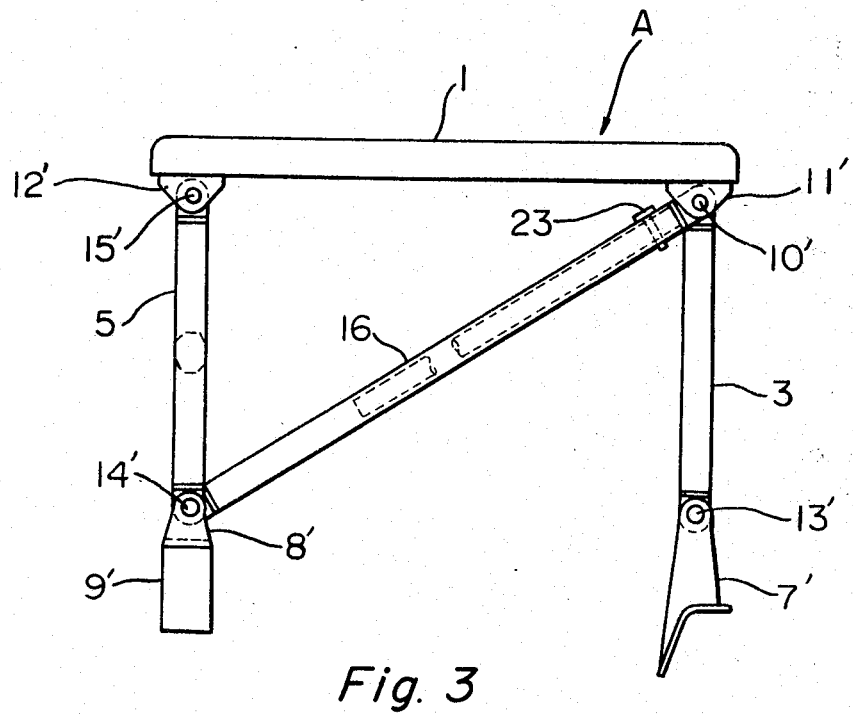
FIG. 3 is a rear elevational view of the protective device.

Accordingly only the removal of restrainer pin 23 of a brace having a sliding mechanism (See FIG. 3.) in the erect condition of protective device A keeps it restrained by force of the other side brace. Lever 21 of the other side brace is manually actuated from this stage and hence diagonal stay 19 (brace) is extended and turned downward by the screw motion of turnbackle screws 17'' and 18''.

On the other hand, since the brace of a sliding mechanism is already released and becomes extensible, it follows the revolution of diagonal stay 19 of a turnbuckle mechanism and both braces can equally be extended and lowered to any height. That is, protective device A rises and falls while making a parallel link motion as a whole.

Conversely when an inverse procedure is started from the most collapsed state and each support is erect, the original state is regained by securing diagonal stay 16 of a sliding mechanism with restrainer pin 23.

A machine such as a construction machine is usually carried in a trailer because of its own low speed. However, the limitation of height of a machine by traffic laws has hitherto required complicated operations of removing a sun-shade, a head guard, a roll-over protective structure, etc. at each time. The appearance of protective device of the present invention has enabled release from such complicated operations and a merit that the collapsing operations can be done by one operator is very great.

In addition, when provision of a head guard on an operator's station is about to become a legal obligation in view of safety stadards, and the material of a roof is inevitably to be changed into a heavyweight structure from a lightweight one, it will be easily understood that three reinforcing actions of supports capable of bearing a heavyweight structure, a pair of left and right braces flexible against stress and load given back and forth and a horizontal stay for bearing lateral load cooperate in perfect unison to bear vibrations of the machine quite efficiently.

In collapsing and raising protective device A while holding the load of roof 1 as a head guard, diagonal stay 19 of a turnbuckle mechanism is actuated by turning equally left and right screws for extension and contraction movements, and hence the weight of the roof falls equally on the left and right screws of diagonal stay 19. It is advantageous that an operator, who handles the protective device can do so with a sense of security.

What is claimed is:

1. A collapsible canopy assembly for protecting an operator's station of a vehicle comprising
    a roof,
    a pair of normally upright transversely spaced front support means each having an upper end thereof pivotally connected to said roof and a lower end pivotally connected to the vehicle,
    a pair of normally upright transversely spaced rear support means spaced longitudinally from said front support means and each having an upper end thereof pivotally connected to said roof and a lower end pivotally connected to the vehicle to form a parallelogram-type linkage with said roof and said front support means,
    at least one stay diagonally disposed and pivotally interconnected between said roof and adjacent to a lower end of one of said front and rear support means, said stay comprising adjustment means including at least one shaft threadably mounted in a cylinder for selectively extending or retracting said stay upon relative rotation of said shaft and cylinder.

2. The canopy assembly of claim 1 further comprising lever means attached to said cylinder for selectively rotating the same relative to said shaft for selectively extending or retracting said stay.

3. The canopy assembly of claim 1 wherein a pair of said shafts are threadably mounted in opposite ends of said cylinder.

4. The canopy assembly of claim 1 further comprising a second stay, disposed on an opposite side of said canopy assembly from said first-mentioned stay, diagonally disposed and pivotally interconnected between said roof and adjacent to a lower end of the same one of said front and rear support means whereat said first-mentioned stay is pivotally connected, said second stay comprising a slide shaft reciprocally mounted in a cylinder and a retaining means normally releasably disposed in a common bore formed transversely through said slide shaft and said cylinder for preventing relative movement therebetween when said second stay is fully extended.

5. The canopy assembly of claim 1 wherein each of said front and rear support means comprises a pair of laterally spaced supports each having a lower end thereof pivotally mounted on a support bracket.

6. The canopy assembly of claim 5 wherein each one of said support brackets is secured on a construction vehicle.

7. The canopy assembly of claim 1 wherein an upper end of said stay is pivotally mounted on a bracket secured to said roof, on a common pivot axis pivotally connecting an upper end of said rear support means to said roof.

8. The canopy assembly of claim 7 wherein a lower end of said stay is pivotally mounted on a support bracket having the lower end of said front support means pivotally mounted thereon.

9. The canopy assembly of claim 1 wherein said rear support means further comprises a horizontally disposed stay secured between a pair of vertically disposed supports thereof.

* * * * *

UNITED STATES PATENT AND TRADEMARK OFFICE
CERTIFICATE OF CORRECTION

PATENT NO. : 3,917,310
DATED : November 4, 1975
INVENTOR(S) : YOSHIJI MITSUISHI

It is certified that error appears in the above-identified patent and that said Letters Patent are hereby corrected as shown below:

Title Page, [73] Assignee, should be:

CATERPILLAR MITSUBISHI LTD.,
      Tokyo, Japan

Col. 1, line 56, "morethan" should read --more than--;

line 67, after "holes" delete "in place thereof"

and insert --for insertion of--.

Col. 2, line 27, "turn-buckele" should read --turn-buckle--;

line 67, after "mechanism" delete "embedded" and insert --incorporated therein--.

Col. 3, line 56, delete "of" after "interiorly".

Signed and Sealed this eleventh Day of May 1976

[SEAL]

Attest:

RUTH C. MASON
Attesting Officer

C. MARSHALL DANN
Commissioner of Patents and Trademarks